Oct. 7, 1930.  J. F. DAUKUS  1,777,399
FRICTION CLUTCH
Filed June 30, 1927
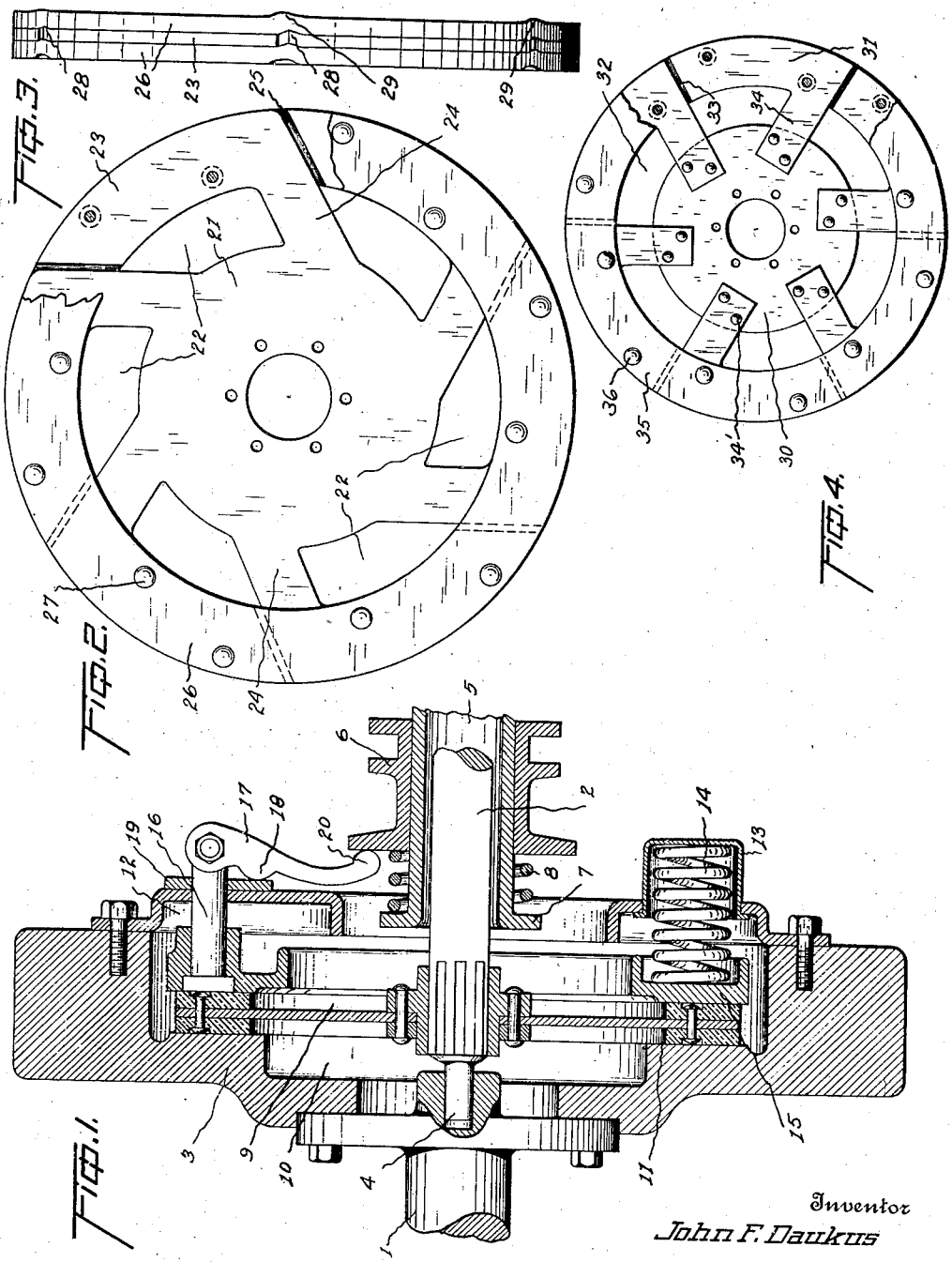
Inventor
John F. Daukus
By
Attorney Patented Oct. 7, 1930

1,777,399

UNITED STATES PATENT OFFICE

JOHN F. DAUKUS, OF DETROIT, MICHIGAN

FRICTION CLUTCH

Application filed June 30, 1927. Serial No. 202,608.

The principal object of the present invention is to provide a friction clutch constructed in such a manner that it will not chatter when brought into engagement with its driving member. The device is constructed particularly for automobiles but it is nevertheless useful in other instances where a coupling by means of a friction clutch is to be effected.

In present devices of analogous construction there is provided an entirely rigid clutch plate which is incapable of yielding when initially applied to the driving member. Consequently the slippage between the driving member and clutch plate, due to the inertia of the latter, causes an alternating gripping and releasing action between the driving member and clutch plate with the result that a chattering effect occurs in the clutch mechanism. This defect is overcome in the present invention by forming the clutch plate in such a manner that it will slightly yield when first applied to the driving member. Due to this yieldability, the engagement between the clutch plate and driving member is not interrupted as stated above but is gradual until the parts are in complete driving engagement and in motion at the same speed.

The invention is fully disclosed in the following description and in the accompanying drawing, in which—

Figure 1 is a sectional view of a clutch mechanism constructed according to the invention;

Fig. 2 is an elevation of the clutch member;

Fig. 3 is an edge view; and

Fig. 4 is an elevation of a modified construction.

Reference to these views will now be made by use of like characters which are employed to designate corresponding parts throughout.

In Figure 1 is illustrated a drive shaft 1 and a propeller shaft 2 in alignment therewith. The drive shaft carries a recessed flywheel 3, and the propeller shaft has an end pin 4 which enters an end of the drive shaft and is adapted to turn loosely therein. The propeller shaft is surrounded by a fixed sleeve 5 on which is mounted a slidable collar 6. Between the collar and a flange 7 at one end of the sleeve is mounted a spring 8 which normally retracts the member 6.

The inner end of the propeller shaft 2 carries a clutch member 9 disposed in the recess 10 of the flywheel and adapted to engage a face 11 thereof. Over the recess is secured a cap member 12 having a series of cups 13 in which are seated springs 14. These springs bear against a ring 15 which is normally moved against the other side of the clutch member. From the ring 15 a pin 16 extends through the cap 12 and is fitted at its outer end with a lever 17. The lever has a lug 18 bearing on a plate 19 secured to the cap and has its free end 20 in engagement with the inner end of the slidable collar 6.

The springs 14 normally hold the clutch member 9 in engagement with the face 11 of the flywheel so that the propeller shaft is driven by the drive shaft 1. When it is desired to release the connection between the two shafts, the collar 6 is moved inwardly on the sleeve 5 against the action of the spring 8 by any suitable mechanism. This movement causes the lever 17 to turn on the lug 18 as a pivot and to retract the ring 15 from the clutch member against the action of the springs 14 whereby engagement between the clutch member and flywheel is released.

When it is desired to return the clutch member into engagement with the face 11, the collar 6 is released so that it is retracted by the spring 8, and the springs 14 are now free to move the ring 15 towards the face 11 and to clamp the clutch member against this face. The propeller shaft 2, being at rest, will have considerable inertia resisting rotation of the clutch member with the flywheel. If the clutch member is entirely rigid, there will be chattering as a result of the conditions already described. The possibility of chattering is overcome by constructing the clutch member in the manner illustrated more clearly in Figures 2, 3 and 4.

This member includes a plate 21 which is preferably circular and formed with a series of openings 22 around the center thereof. These openings leave a marginal portion 23 around the edge of the plate and are preferably closely spaced in order to form narrow arms 24 therebetween. These arms may be angular to the radius of the plate as illustrated or may lie in radii of the plate. The rim 23 is slotted at 25 from an edge of each opening 22 alongside one of the arms 24. Finally, friction rings 26 are applied to the rim 23 at both faces thereof, and the parts are firmly secured together by rivets 27. The rim 23, at the edges of the slots 25, is preferably bent laterally or outwardly from the plane of the plate as indicated by the numeral 28, as a result of which projections 29 are formed on the surface of the friction ring 26 which engages the flywheel face 11. These projections provide a small area of contact between the clutch member and the flywheel when the parts are first brought into engagement, and the surface of contact increases as the clutch member is moved more closely to the flywheel. The narrow arms 24 formed between the openings 22 are capable of yielding during the initial engagement between the clutch member and the flywheel. This yieldability is further facilitated by the slots 25 cut through the rim 23. In this manner movement in the clutch member is possible during its initial engagement with the flywheel, although the entire clutch member may not rotate bodily until the inertia of the propeller shaft is substantially overcome. During the limited movement of the rim by the flexing of the arms 24, the inertia of the propeller shaft is at least partially overcome so that chattering is avoided.

In Figure 4 is illustrated a construction, wherein the clutch plate is an assembled member rather than a unitary member as shown in Figure 2. The device in Figure 4 is comprised of a central plate 30 and a series of segmental members 31 which form a rim around the plate and a space 32 therebetween. The segments 31 are slightly spaced from one another to form slots 33 corresponding to the slots 25 and are provided each with an arm 34 at one end bridging the space 32 and secured to the central plate 30 by studs 34'. The arms 34 are sufficiently narrow to permit flexing under the conditions described in connection with the arms 24 of Figure 2.

Friction rings 35 are secured to both faces of the segments 31 by means of rivets 36. The segments may be bent laterally at the slots 33 in the manner described in connection with Figures 2 and 3, if desired.

Although specific embodiments of the invention have been illustrated and described, it will be understood that various alterations in the details of construction may be made without departing from the scope of the invention as indicated by the appended claim.

What I claim is:—

A clutch plate having a series of openings around its center and between the center and periphery thereof, said openings being spaced from each other to form narrow arms, said arms lying angularly to radii of the plate, said plate also having slots extending from the respective openings to the periphery, and disposed in prolongation of an edge of the respective communicating opening.

In testimony whereof I affix my signature.

JOHN F. DAUKUS.